United States Patent
Austruy et al.

(10) Patent No.: US 8,291,180 B2
(45) Date of Patent: Oct. 16, 2012

(54) LOOSE SYNCHRONIZATION OF VIRTUAL DISKS

(75) Inventors: Maxime Austruy, Mountain View, CA (US); Jad Chamcham, Mountain View, CA (US); Christian Leroy, San Francisco, CA (US); Christian Czezatke, San Francisco, CA (US); Asit Desai, San Ramon, CA (US)

(73) Assignee: VMware, Inc., Palo Alto, CA (US)

( * ) Notice: Subject to any disclaimer, the term of this patent is extended or adjusted under 35 U.S.C. 154(b) by 1030 days.

(21) Appl. No.: 12/052,468

(22) Filed: Mar. 20, 2008

(65) Prior Publication Data

US 2009/0240904 A1    Sep. 24, 2009

(51) Int. Cl.
*G06F 12/00* (2006.01)
(52) U.S. Cl. ........................ 711/162; 718/108
(58) Field of Classification Search .................. None
See application file for complete search history.

(56) References Cited

U.S. PATENT DOCUMENTS

| | | | |
|---|---|---|---|
| 5,546,557 A * | 8/1996 | Allen et al. | 711/111 |
| 7,127,578 B2 * | 10/2006 | Nagata | 711/162 |
| 7,447,854 B1 * | 11/2008 | Cannon | 711/162 |
| 2006/0161808 A1 * | 7/2006 | Burkey | 714/6 |
| 2007/0067593 A1 * | 3/2007 | Satoyama et al. | 711/165 |
| 2007/0294314 A1 * | 12/2007 | Padovano et al. | 707/201 |
| 2009/0089781 A1 * | 4/2009 | Shingai et al. | 718/1 |

* cited by examiner

*Primary Examiner* — Kevin Ellis
*Assistant Examiner* — Baboucarr Faal

(57) ABSTRACT

Computer implemented methods, computer program products and computer systems synchronize copies of a virtual disk. A record of blocks that are modified during an access session of a copy of the virtual disk is maintained. For each partition of the virtual disk, a file system level indication of currently relevant blocks is obtained. Only those blocks that were modified during the access session and are currently relevant are copied to at least one additional copy of the virtual disk.

22 Claims, 4 Drawing Sheets

LOOSE SYNCHRONIZATION OF VIRTUAL DISKS

TECHNICAL FIELD

One or more embodiments of this invention pertain generally to virtual computing, and more specifically to synchronizing multiple copies of a virtual disk.

BACKGROUND

Virtualization technologies are becoming prevalent in the market place. At least some of these technologies provide a virtual hardware abstraction to guest operating systems, and allow them to run in virtual machines in a functionally isolated environment on a host computer without being modified. Virtualization allows one or more virtual (guest) machines to run on a single physical (host) computer, providing functional and performance isolation for processor, memory, storage, etc. Virtual computers and systems are discussed below in the Appendix in conjunction with FIG. 1.

Like physical machines, virtual machines have storage media such as hard disks (virtual hard disks, in the case of virtual machines), along with other peripheral devices. Typically, a virtual machine's virtual hard disk is used to store the guest operating system, application programs and application data.

It is sometimes desirable for users to maintain multiple copies of a single virtual disk on one or more physical machines. For example, a user might want to keep a back up copy of a virtual disk on a second hard drive of a physical machine on which a virtual machine runs, or on a separate physical machine. A user may also wish to run multiple copies of the same virtual machine on a single physical machine, or on multiple physical machines, for example both a physical desktop computer in the office, and on a physical laptop used when traveling.

Whenever a user maintains multiple copies of the same virtual disk, s/he likely wants to be able to have that same virtual disk available without needing to copy a large amount of data between physical media or computers. The user would like simply to be able to automatically synchronize the copies of the virtual disk. The user is interested in having copies of the same virtual disk at multiple locations, not multiple instances of the same virtual machine.

So long as the physical computer(s) involved have virtualization technology that allows operation of virtual machines, copies of the same virtual disk can be maintained at multiple locations. However, when a specific copy of a virtual disk is updated (for example by an associated copy of a virtual machine running on a physical machine and accessing the virtual disk), that copy of the virtual disk will contain updates that are not present on the other copies. Thus, in order to maintain multiple copies of the same virtual disk, the copies of the virtual disk should be synchronized between access sessions.

SUMMARY OF INVENTION

Computer implemented methods, computer program products and computer systems synchronize copies of a virtual disk. A record of blocks that are modified during an access session of a copy of the virtual disk is maintained. For each partition of the virtual disk, a file system level indication of currently relevant blocks is obtained. Only those blocks that were modified during the access session and are currently relevant are copied to at least one additional copy of the virtual disk.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 2:
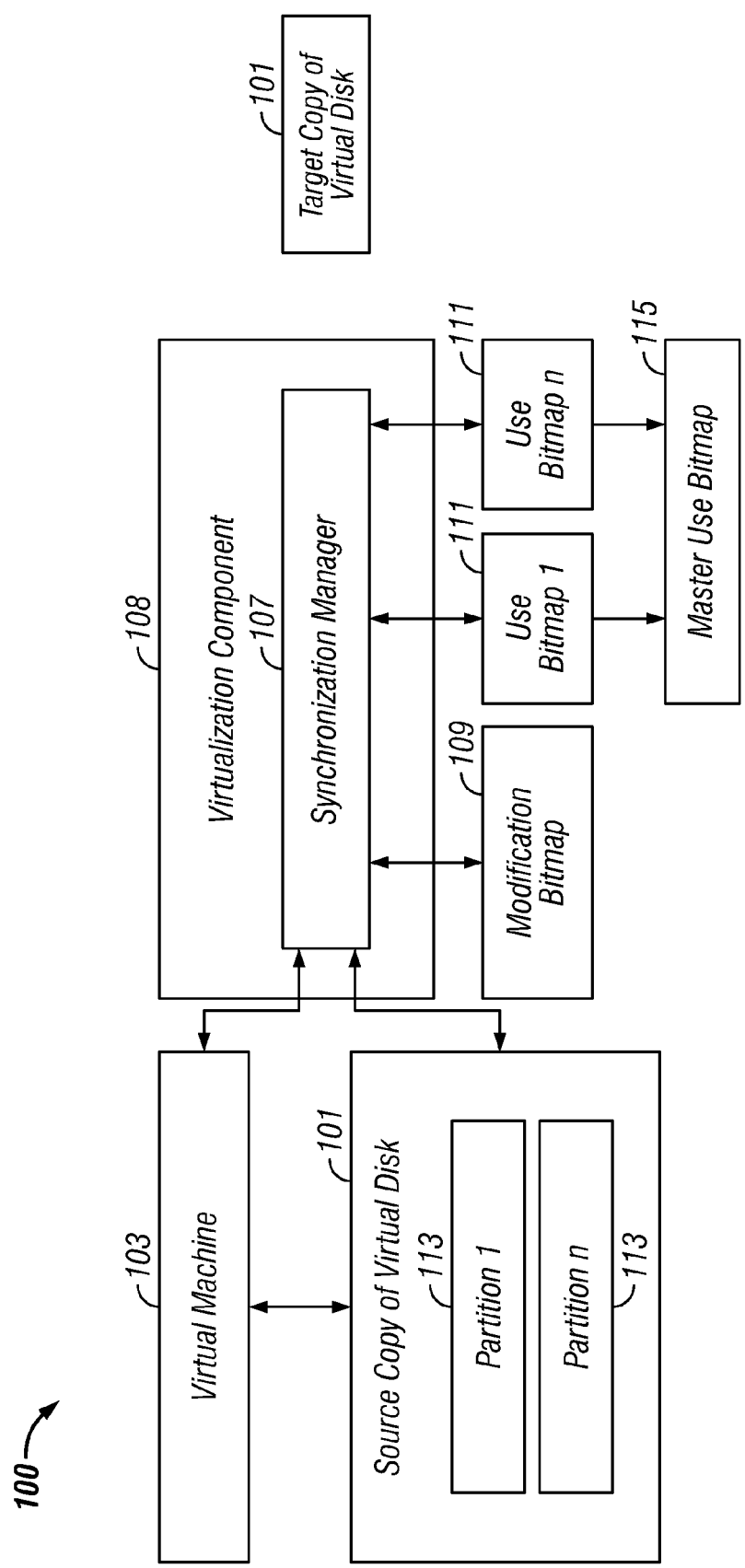
FIG. 2 is a block diagram illustrating a system in which copies of a virtual disk are synchronized, according to some embodiments of the present invention.

FIG. 2 illustrates system 100 in which multiple copies of a single virtual disk 101 are synchronized, according to some embodiments of the present invention. It is to be understood that although various components are illustrated in FIG. 2 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

In the embodiment illustrated in FIG. 2, a single virtual disk 101 is installed at two separate locations. It is to be understood that copies of virtual disk 101 to be synchronized can be located on a single physical computer (for example, primary and backup copies on separate hard drives of a physical computer) or on two or more separate physical computers (for example, in association with a single virtual machine 103 installed on both a desktop computer and a laptop computer). It is to be understood that although only two copies of virtual disk 101 are illustrated in FIG. 2, more than two copies can be maintained as desired. As will be readily apparent to those of ordinary skill in the relevant art in light of this specification, the methodology described herein is equally applicable to synchronizing more than two copies of virtual disk 101.

Whenever a copy of virtual disk 101 is accessed (e.g., by execution of associated virtual machine 103 as illustrated, by another application, or directly by a user), synchronization manager 107 which is part of virtualization component 108 (e.g., a VMM, a hypervisor, a virtualization kernel, etc.) creates and maintains modification bitmap 109 of blocks that are written (i.e., dirty blocks). It is to be understood that other data structures can be substituted for modification bitmap 109 (e.g., an array, a linked list, etc.) and used to keep track of which blocks are modified. The implementation mechanics of using bitmap 109 (or other data structure) to keep track of dirty blocks is within the knowledge base of one of ordinary skill in the relevant art, and the use thereof within the context of embodiments of the present invention will be readily apparent to one of such a skill level in light of this specification.

For example, synchronization manager 107 can maintain bitmap 109 in which each block of virtual disk 101 is represented by a bit (or multiple bits), and the default value of each bit indicates that the corresponding block has not been modified (for example, the bits of the bitmap can be initialized to, e.g., 0). During execution of virtual machine 103 or other access of virtual disk 101, synchronization component 107 detects modifications made to blocks of virtual disk 101, and updates the values of the corresponding bits (e.g., to 1). When a user wishes to synchronize copies of virtual disk 101 (e.g., the user wants to run virtual machine 103 associated with virtual disk 101 on a different physical computer, or the user wishes to perform an incremental backup of virtual disk 101), the user typically powers off any active virtual machine 103 associated with virtual disk 101, through virtualization component 108. At this point, in order to perform the synchronization operation, synchronization component 107 obtains a file system level indication of currently relevant blocks of source copy of virtual disk. As is understood by those of ordinary skill in the relevant art, most modern operating systems store temporary information from memory on disk for memory management and caching. In some embodiments of the present invention, blocks that are in use by the file system for purposes other than such temporary information storage are considered relevant, but blocks used to store such temporary information are not considered relevant.

More specifically, synchronization component 107 obtains use bitmap 111 (or other data structure) indicating currently used blocks for each partition 113 of source virtual disk 101 (bitmap 111 can map blocks currently used for purposes other than temporary information storage, or all currently used blocks). Note that at virtual disk 101 file system level, a block is considered used if it stores file data, or if it stores file system metadata. Given file system level bitmaps 111 indicating relevant blocks for each partition 113, synchronization component 107 can build master use bitmap 115 of relevant blocks for virtual disk 101. Master use bitmap 115 can be used to synchronize the target copy of virtual disk 101, as discussed in more detail below in conjunction with FIG. 4.

Concerning the obtaining of use bitmaps 111, virtual disk 101 can comprise multiple partitions 113, each of which can house a different file system. For example, virtual disk 101 can have an NTFS partition and a partition on which a Linux file system (e.g., ext2, ext3, etc.) is installed. Of course, other file systems can be installed on partitions 113 of virtual disks 101 as well. In any case, for each partition 113 of virtual disk 101, synchronization component 107 obtains a file system level indication of block usage (i.e., currently used, or relevant blocks).

The specific implementation mechanics for obtaining block usage data varies from file system to file system. For example, some Linux file systems include a bitmap indicating block usage, the internal location and format of which is known as part of the open Linux specifications. NTFS also maintains such a bitmap 111, and although Windows is not an open system per se, the protocol for obtaining this information from NTFS has been published, and is known to those of ordinary skill in the relevant art. Other operating systems may maintain and store this information in other formats, but the implementation mechanics of traversing the internals of a file system and obtaining block usage data is within the skill set of one of ordinary skill in the relevant art, and the usage thereof within the context of embodiments of the present invention will be readily apparent to one of such a skill level in light of this specification. In some embodiments, commercial or open source libraries are used for obtaining this information.

Figure 3:
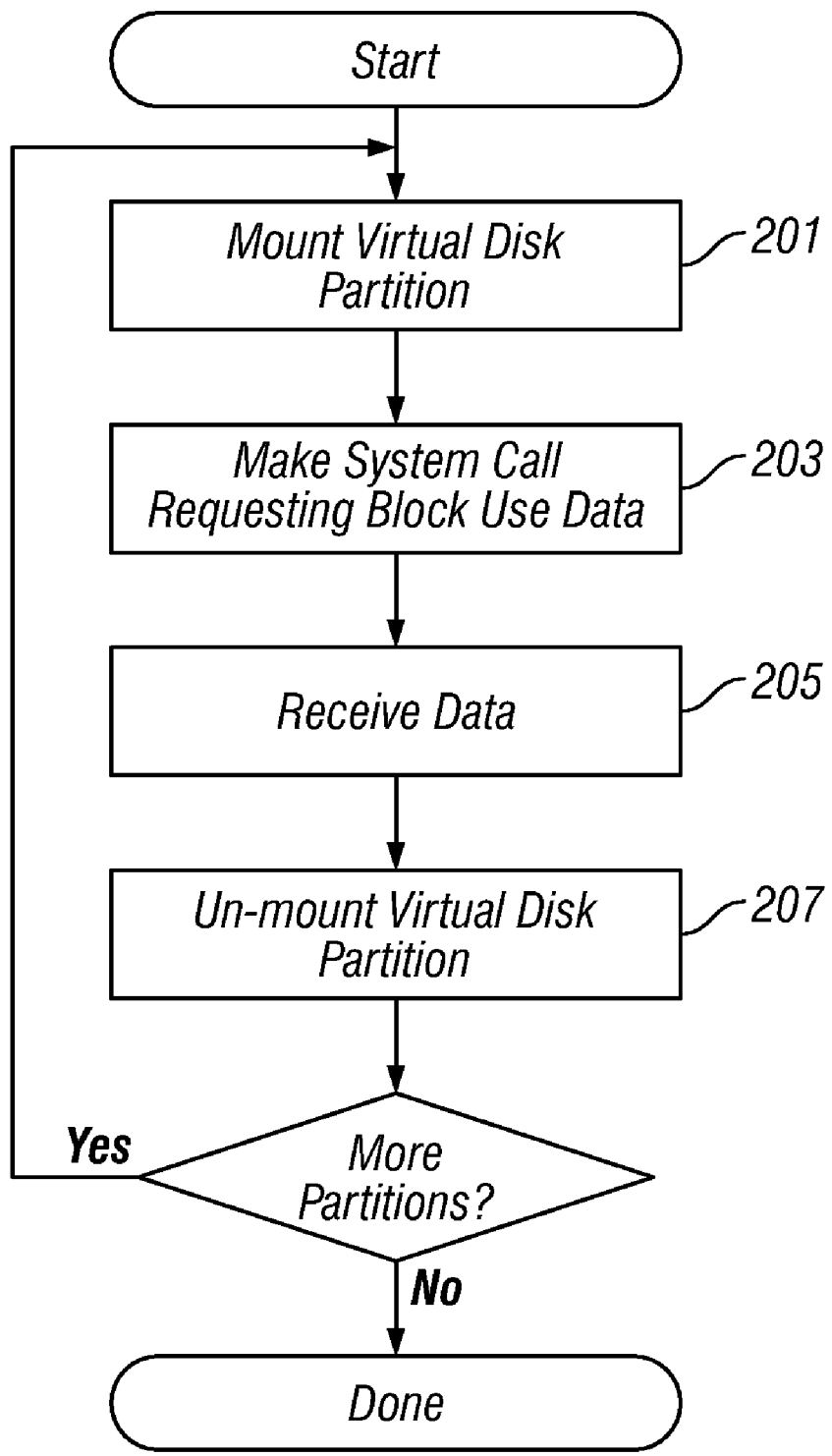
FIG. 3 is a flowchart, illustrating steps for obtaining file system usage data, according to one embodiment of the present invention.

FIG. 3 illustrates steps for obtaining file system usage data according to another embodiment of the present invention. The embodiment illustrated in FIG. 3 is practiced within the context of a hosted configuration, in which a host operating system is running under virtualization component 108, on a host hardware platform. Of course, other embodiments of the present invention can be practiced within the context of either a hosted or non-hosted configuration, as discussed below in the Appendix. In the embodiment illustrated in FIG. 3, rather than obtaining internal file system use data, synchronization manager 107 mounts (at step 201) each virtual disk 101 partition 113 at a host level, and calls (at step 203) the (host) operating system to request internal file system maintained block usage data. Operating systems typically provide system calls that return such information. Responsive to making the system calls, synchronization manager 107 receives (at step 205) internal file system maintained data indicating use statuses of the blocks of partitions 113. After obtaining this data, synchronization manager 107 un-mounts (at step 207) virtual disk 101 partition 113.

It is to be understood that mounting virtual disk partitions 113 at a host level exposes virtual disk 101 to the host operating environment (e.g., to viruses, privacy concerns, etc.). Furthermore, the technique of this embodiment assumes that the host operating system can understand the internal formats of each file system installed on virtual disk 101.

Figure 4:
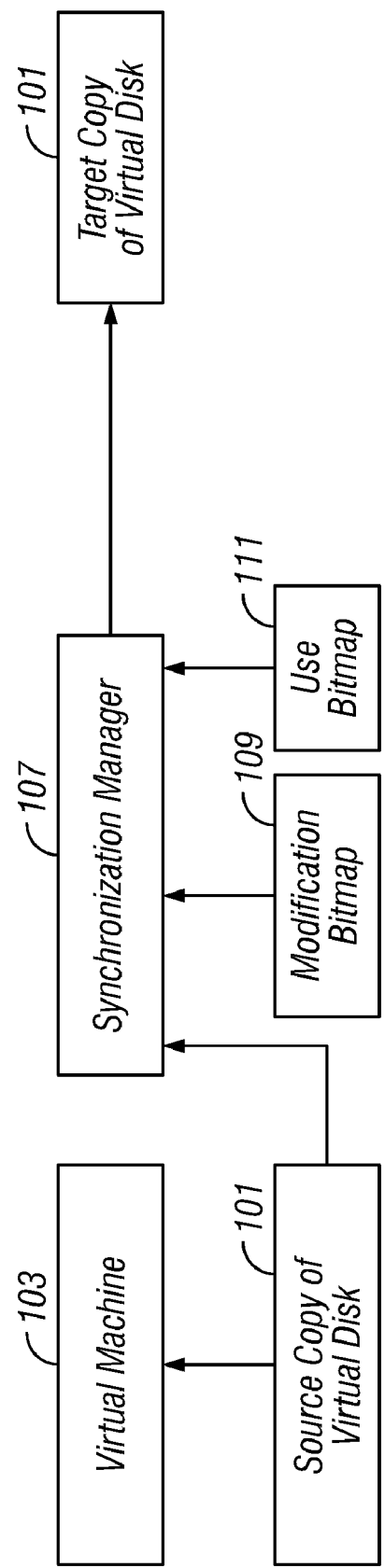
FIG. 4 is a block diagram illustrating components for copying desired blocks of a source copy of a virtual disk to a target copy, according to some embodiments of the present invention.

Turning now to FIG. 4, once internal block usage data has been obtained, synchronization manager 107 copies blocks that were modified during access of source copy of virtual disk 101 and are currently utilized to target copy of virtual disk 101. More specifically, synchronization manager 107 iterates over all the dirty blocks referenced by modification bitmap 109 (or other data structure). If a given dirty block is also marked as being relevant in use bitmap 111, synchronization manager 107 transfers it to target copy of virtual disk 101. Consequently, only those blocks that are relevant, that is to say were both modified during the access session of source copy of virtual disk 101 and are currently utilized, are copied to target copy of virtual disk 101. Virtual disk blocks that were used at some time during the access session but are no longer in use are not copied.

Where virtual disk 101 being synchronized contains multiple partitions 113, modification bitmap 109 for each partition 113 can be merged, or processed separately. The implementation mechanics of merging multiple bitmaps 109 is within the skill set of one of ordinary skill in the relevant art, and the usage thereof within the context of embodiments of the present invention will be readily apparent to one of such a skill level in light of this specification. Where desired, multiple target copies of virtual disk 101 can be synchronized to source copy 101.

These techniques can be utilized, for example, to synchronize the copy of virtual disk 101 on another physical computer on which a user wishes to run an associated virtual machine 103. Another use for these techniques is to copy modified blocks to a backup copy of virtual disk 101. By copying only modified blocks, an incremental backup procedure can be efficiently executed.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Accordingly, the disclosure of the present invention is intended to be illustrative, but not limiting, of the scope of the invention, which is set forth in the following claims.

Appendix Relating to Virtualized Computer Systems

Figure 1:
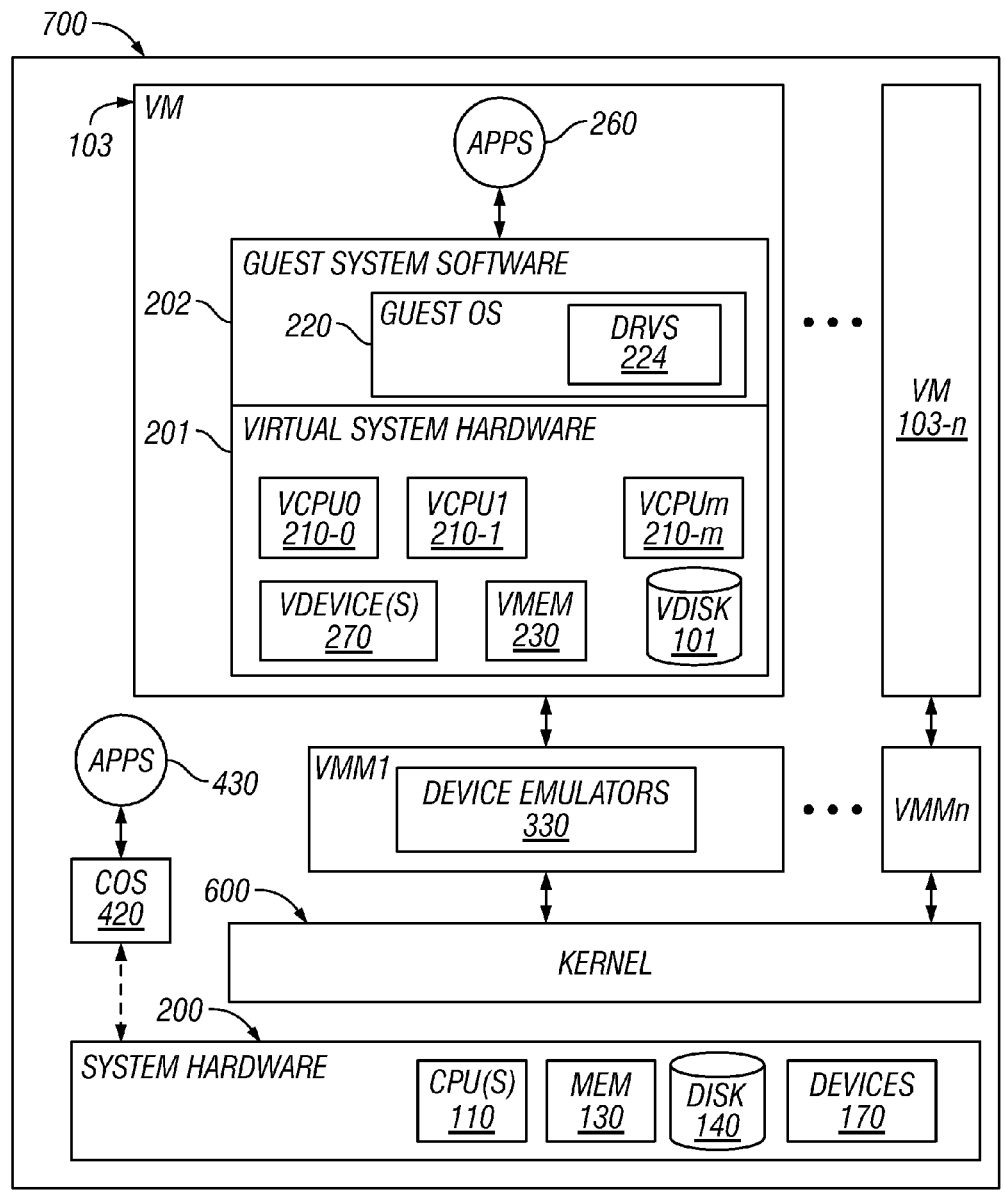
FIG. 1 is a block diagram illustrating an example of prior art virtualization technology.

As is well known in the field of computer science, a virtual machine is an abstraction—a "virtualization"—of an actual physical computer system. FIG. 1 shows one possible arrangement of a computer system (computer system 700) that implements virtualization. As shown in FIG. 1, virtual machine or "guest" 103 is installed on a "host platform," or simply "host," which includes system hardware, that is, hardware platform 200, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each virtual machine 103 will typically have both virtual system hardware 201 and guest system software 202. The virtual system hardware typically includes at least one virtual CPU, virtual memory 230, at least one virtual disk 101, and one or more virtual devices 270. Note that a disk—virtual or physical—is also a "device," but is usually considered separately because of the important role of the disk. All of the virtual hardware components of the virtual machine may be implemented in software using known techniques to emulate the corresponding physical components. The guest system software includes guest operating system (OS) 220 and drivers 224 as needed for the various virtual devices 270.

Note that a single virtual machine may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP virtual machines. FIG. 1, for example, illustrates multiple virtual processors 210-0, 210-1, . . . , 210-*m* (VCPU0, VCPU1, . . . , VCPUm) within virtual machine 103.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another configuration that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. One or more embodiments of this invention may be used regardless of the type—physical and/or logical—or number of processors included in a virtual machine.

In many cases applications 260 running on virtual machine 103 will function as they would if run on a "real" computer, even though the applications are running at least partially indirectly, that is via guest OS 220 and virtual processor(s). Executable files will be accessed by the guest OS from virtual disk 101 or virtual memory 230, which will be portions of the actual physical disk 140 or memory 130 allocated to that virtual machine. Once an application is installed within the virtual machine, the guest OS retrieves files from the virtual disk just as if the files had been pre-stored as the result of a conventional installation of the application. The design and operation of virtual machines are well known in the field of computer science.

Some interface is generally required between the guest software within a virtual machine and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" virtual machine to facilitate the operations of other virtual machines. Furthermore, specific software support for virtual machines may be included in the host OS itself. Unless otherwise indicated, one or more embodiments of the invention described herein may be used in virtualized computer systems having any type or configuration of virtualization software.

FIG. 1 shows virtual machine monitors that appear as separate entities from other components of the virtualization software. Furthermore, some software components used to implement one or more embodiments of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that one or more embodiments of the invention can be implemented anywhere within the overall structure of the virtualization software, and even in systems that provide specific hardware support for virtualization.

The various virtualized hardware components in the virtual machine, such as virtual CPU(s) 210-0, 210-1, . . . , **210-*m*, virtual memory 230, virtual disk 101, and virtual device(s) 270, are shown as being part of virtual machine 103 for the sake of conceptual simplicity. In actuality, these "components" are usually implemented as software emulations 330** included in the VMM.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term, which has yet to achieve a universally accepted definition, is that of "para-virtualization." As the term implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, the term para-virtualization implies that the guest OS (in particular, its kernel) is specifically designed to support such an interface. According to this view, having, for example, an off-the-shelf version of Microsoft Windows XP™ as the guest OS would not be consistent with the notion of para-virtualization. Others define the term para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of this invention are not restricted to use in systems with any particular "degree" of virtualization and are not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM.

As illustrated in FIG. 1, in many cases, it may be beneficial to deploy VMMs on top of a software layer—kernel 600—constructed specifically to provide support for the virtual machines. This configuration is frequently referred to as being "non-hosted." Kernel 600 also handles any other applications running on it that can be separately scheduled, as well as a console operating system that, in some architectures, is used to boot the system and facilitate certain user interactions with the virtualization software.

Note that kernel 600 is not the same as the kernel that will be within guest OS 220—as is well known, every operating system has its own kernel. Note also that kernel 600 is part of the "host" platform of the virtual machine/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

What is claimed is:

1. A computer implemented method for synchronizing copies of a virtual disk, the method comprising the steps of:

maintaining, by a virtualization layer supporting execution of a virtual machine, a record of blocks of a copy of a virtual disk that are modified during an access session by the virtual machine;

for each partition of the virtual disk, obtaining a second record of blocks from a file system of the partition of the virtual disk, wherein the second record of blocks maintains an indication of whether a block is used by the file system for purposes other than storing temporary information; and copying blocks that were modified during the access session and are currently used by the file system for purposes other than storing temporary information to at least one additional copy of the virtual disk.

2. The method of claim 1 wherein maintaining the record of blocks of the virtual disk that are modified during the access session further comprises:

maintaining a bitmap in which each block of the virtual disk is represented by at least one bit, wherein the default value of each at least one bit indicates that the corresponding block has not been modified; and responsive to a block of the virtual disk being modified during the access session, updating the value of the corresponding at least one bit to so indicate.

3. The method of claim 1 wherein obtaining the second record of blocks from the file system of the partition of the virtual disk further comprises:

obtaining an internal file system maintained bitmap in which blocks of the virtual disk are represented by bits, wherein the values of the bits indicate usage statuses of corresponding blocks.

4. The method of claim 1 wherein obtaining the second record of blocks from the file system of the partition of the virtual disk, further comprises:
   for each partition of the virtual disk, obtaining an internal file system maintained bitmap, in which blocks of the partition are represented by bits, wherein the values of the bits indicate usage statuses of corresponding blocks.

5. The method of claim 4 further comprising:
   merging at least two obtained internal file system maintained bitmaps into a single bitmap.

6. The method of claim 1 wherein the second record of blocks from the file system of the partition of the virtual disk further comprises:
   for each partition of the virtual disk:
      mounting a corresponding file system at a host level;
      calling an operating system to request internal file system maintained block usage data;
      responsive to the request, receiving internal file system maintained data indicating use statuses of blocks of the partition of the virtual disk; and
      un-mounting the corresponding file system at a host level.

7. The method of claim 1 wherein copying blocks to at least one additional copy of the virtual disk further comprises performing at least one step from a group of steps consisting of:
   copying the blocks to a copy of the virtual disk on a separate physical computer on which a user runs an associated virtual machine; and
   copying the blocks to a backup copy of the virtual disk.

8. At least one non-transitory computer readable medium containing a computer program product for synchronizing copies of a virtual disk, the computer program product comprising:
   program code for maintaining, by a virtualization layer supporting execution of a virtual machine, a record of blocks of a copy of a virtual disk that are modified during an access session by the virtual machine;
   program code for, for each partition of the virtual disk, obtaining a second record of blocks from a file system of the partition of the virtual disk, wherein the second record of blocks maintains an indication of whether a block is used by the file system for purposes other than storing temporary information; and
   program code for copying blocks that were modified during the access session and are currently used by the file system for purposes other than storing temporary information to at least one additional copy of the virtual disk.

9. The non-transitory computer readable medium of claim 8 wherein the program code for maintaining the record of blocks of the virtual disk that are modified during the access session further comprises:
   program code for maintaining a bitmap in which each block of the virtual disk is represented by at least one bit, wherein the default value of each at least one bit indicates that the corresponding block has not been modified; and
   program code for, responsive to a block of the virtual disk being modified during the access session, updating the value of the corresponding at least one bit to so indicate.

10. The non-transitory computer readable medium of claim 8 wherein the program code for obtaining the second record of blocks from the file system of the partition of the virtual disk further comprises:
   program code for obtaining an internal file system maintained bitmap in which blocks of the virtual disk are represented by bits, wherein the values of the bits indicate usage statuses of corresponding blocks.

11. The non-transitory computer readable medium of claim 8 wherein the program code for obtaining the second record of blocks from the file system of the partition of the virtual disk, further comprises:
   program code for, for each partition of the virtual disk, obtaining an internal file system maintained bitmap, in which blocks of the partition are represented by bits, wherein the values of the bits indicate usage statuses of corresponding blocks.

12. The non-transitory computer readable medium of claim 11 further comprising:
   program code for merging at least two obtained internal file system maintained bitmaps into a single bitmap.

13. The non-transitory computer readable medium of claim 8 wherein the program code for obtaining the second record of blocks from the file system level of the partition of the virtual disk further comprises:
   program code for, for each partition of the virtual disk:
      mounting a corresponding file system at a host level;
      calling an operating system to request internal file system maintained block usage data;
      responsive to the request, receiving internal file system maintained data indicating use statuses of blocks of the partition of the virtual disk; and
      un-mounting the corresponding file system at a host level.

14. The non-transitory computer readable medium of claim 8 wherein the program code for copying blocks to at least one additional copy of the virtual disk further comprises program code for performing at least one step from a group of steps consisting of:
   copying the blocks to a copy of the virtual disk on a separate physical computer on which a user runs an associated virtual machine; and
   copying the blocks to a backup copy of the virtual disk.

15. A computer system for synchronizing copies of a virtual disk, the computer system comprising a processor configured to perform the steps of:
   maintaining, by a virtualization layer supporting execution of a virtual machine, a record of blocks of a copy of a virtual disk that are modified during an access session;
   for each partition of the virtual disk, obtaining a second record of blocks from a file system of the partition of the virtual disk, wherein the second record of blocks maintains an indication of whether a block is used by the file system for purposes other than storing temporary information; and
   copying blocks that were modified during the access session and are currently used by the file system for purposes other than storing temporary information to at least one additional copy of the virtual disk.

16. The computer system of claim 15 wherein the step of maintaining the record of blocks of the virtual disk that are modified during the access session further comprises:
   maintaining a bitmap in which each block of the virtual disk is represented by at least one bit, wherein the default value of each at least one bit indicates that the corresponding block has not been modified; and
   responsive to a block of the virtual disk being modified during the access session, updating the value of the corresponding at least one bit to so indicate.

17. The computer system of claim 15 wherein the step of obtaining the second record of blocks from the file system of the partition of the virtual disk further comprises:

obtaining an internal file system maintained bitmap in which blocks of the virtual disk are represented by bits, wherein the values of the bits indicate usage statuses of corresponding blocks.

18. The computer system of claim 15 wherein the step of obtaining the second record of blocks from the file system of the partition of the virtual disk further comprises:

for each partition of the virtual disk, obtaining an internal file system maintained bitmap, in which blocks of the partition are represented by bits, wherein the values of the bits indicate usage statuses of corresponding blocks.

19. The computer system of claim 15 wherein the means for step of obtaining the second record of blocks from file system of the partition of the virtual disk further comprises:

for each partition of the virtual disk:
   mounting a corresponding file system at a host level;
   calling an operating system to request internal file system maintained block usage data;
   responsive to the request, receiving internal file system maintained data indicating use statuses of blocks of the partition of the virtual disk; and
   un-mounting the corresponding file system at a host level.

20. The computer system of claim 15 wherein the step of copying blocks to at least one additional copy of the virtual disk further comprises performing at least one step from a group of steps consisting of:

copying the blocks to a copy of the virtual disk on a separate physical computer on which a user runs an associated virtual machine; and
copying the blocks to a backup copy of the virtual disk.

21. A computer implemented method for synchronizing copies of a virtual disk, the method comprising the steps of:

shutting down an active session of a first virtual machine, said first virtual machine being associated with a first copy of a virtual disk;
copying blocks of the virtual disk that were modified during the active session and are currently used by a file system of the virtual disk for purposes other than storing temporary information to a second copy of the virtual disk, said second copy of the virtual disk being associated with a second virtual machine; and
starting said second virtual machine, such that said second virtual machine accesses said second copy of the virtual disk.

22. At least one non-transitory computer readable medium containing a computer program product for synchronizing copies of a virtual disk, the computer program product comprising:

program code for shutting down an active session of a first virtual machine, said first virtual machine being associated with a first copy of a virtual disk;
program code for copying blocks of the virtual disk that were modified during the active session and are currently used by a file system of the virtual disk for purposes other than storing temporary information to a second copy of the virtual disk, said second copy of the virtual disk being associated with a second virtual machine; and
program code for starting said second virtual machine, such that said second virtual machine accesses said second copy of the virtual disk.

* * * * *